(12) United States Patent
Tanaka et al.

(10) Patent No.: US 12,374,503 B2
(45) Date of Patent: Jul. 29, 2025

(54) HIGH-VOLTAGE FEEDTHROUGH CAPACITOR

(71) Applicant: TDK CORPORATION, Tokyo (JP)

(72) Inventors: Hisashi Tanaka, Tokyo (JP); Yuta Kamo, Tokyo (JP)

(73) Assignee: TDK CORPORATION, Tokyo (JP)

(*) Notice: Subject to any disclaimer, the term of this patent is extended or adjusted under 35 U.S.C. 154(b) by 203 days.

(21) Appl. No.: 18/465,243

(22) Filed: Sep. 12, 2023

(65) Prior Publication Data

US 2024/0087816 A1    Mar. 14, 2024

(30) Foreign Application Priority Data

Sep. 13, 2022 (JP) ................................. 2022-145167

(51) Int. Cl.
*H01G 4/35* (2006.01)
*H01G 4/005* (2006.01)
*H01G 4/224* (2006.01)
*H01G 4/245* (2006.01)

(52) U.S. Cl.
CPC ............ *H01G 4/35* (2013.01); *H01G 4/005* (2013.01); *H01G 4/224* (2013.01); *H01G 4/245* (2013.01)

(58) Field of Classification Search
CPC ............................... H01G 4/005; H01G 4/224
See application file for complete search history.

(56) References Cited

U.S. PATENT DOCUMENTS

2001/0036053 A1   11/2001   Asada et al.
2005/0142946 A1*  6/2005   Baek ................. H01G 4/35
                                                      439/620.14

FOREIGN PATENT DOCUMENTS

GB         1601857 A   * 11/1981  .............. H01G 4/35
JP    2001-351830 A     12/2001

* cited by examiner

*Primary Examiner* — Timothy J. Dole
*Assistant Examiner* — Kaemon Eli Watada
(74) *Attorney, Agent, or Firm* — Oliff PLC

(57) ABSTRACT

A high-voltage feedthrough capacitor includes: a capacitor including an element body in which a through hole extending is formed, and a first electrode and a second electrode disposed facing each other on the element body; a feedthrough conductor inserted through the through hole and electrically connected to the first electrode; a grounding fitting electrically connected to the second electrode; and a first case and a second case. The element body includes: a first end face and a second end face; a first protruding part in which the through hole opens, the first protruding part being provided on the first end face; and a second protruding part in which the through hole opens, the second protruding part being provided on the second end face. The first case is attached to the first protruding part. The second case is attached to the second protruding part.

17 Claims, 6 Drawing Sheets

HIGH-VOLTAGE FEEDTHROUGH CAPACITOR

TECHNICAL FIELD

The present disclosure relates to a high-voltage feedthrough capacitor. The present application claims priority to Japanese Patent Application No. 2022-145167 filed on Sep. 13, 2022, the content of which is incorporated herein by reference in its entirety.

BACKGROUND

A known high-voltage feedthrough capacitor includes an element body, a first electrode, a second electrode, and a feedthrough conductor (see, for example, Japanese Unexamined Patent Publication No. 2001-351830). A through hole is formed in the element body. The first electrode and the second electrode are provided on either side of the element body having the through hole. The feedthrough conductor is inserted through the through hole, and is electrically connected to the first electrode.

SUMMARY

A high-voltage feedthrough capacitor such as that described above is sealed by a resin sealing material to ensure insulation. However, the use of a resin sealing material may cause problems such as leakage of resin from gaps in the product in the production line.

It is an object of one aspect of the present disclosure to provide a high-voltage feedthrough capacitor that does not use a resin sealing material.

A high-voltage feedthrough capacitor according to one aspect of the present disclosure includes: a capacitor including an element body in which a through hole extending in a first direction is formed, and a first electrode and a second electrode disposed facing each other on the element body; a feedthrough conductor inserted through the through hole and electrically connected to the first electrode; a grounding fitting electrically connected to the second electrode; and a first case and a second case having a tubular shape and surrounding the feedthrough conductor, wherein the element body includes: a first end face and a second end face facing each other in the first direction; a first protruding part in which the through hole opens, the first protruding part being provided on the first end face; and a second protruding part in which the through hole opens, the second protruding part being provided on the second end face, wherein the first case is attached to the first protruding part, and wherein the second case is attached to the second protruding part.

In the high-voltage feedthrough capacitor above, the first case and the second case surround the feedthrough conductor, so that insulation can be ensured without using a resin sealing material. The first case is attached to the first protruding part provided on the first end face of the element body, so that the first case can be reliably fixed. The second case is attached to the second protruding part provided on the second end face of the element body, so that the second case can be reliably fixed.

In the one aspect above, the element body may further include: an outer side face extending in the first direction, and joining the first end face and the second end face; and an inner side face facing the outer side face in a direction perpendicular to the first direction, and defining the through hole, the first electrode may be disposed on the inner side face, and the second electrode may be disposed on the outer side face. In this case, the distance between adjacent capacitors can be shortened by using the second electrode disposed on the outer side face as a ground electrode.

In the one aspect above, the inner side face may have an exposed region exposed from the first electrode in a position adjoining a top face of the second protruding part. In this case, electric shorting can be suppressed by adequately separating the first electrode and the second electrode, even in a case in which the second electrode is disposed on the second end face.

In the one aspect above, the first electrode may include: a first electrode portion disposed on the inner side face; and a second electrode portion disposed on a top face of the first protruding part, and the feedthrough conductor may include a flange part facing the second electrode portion in the first direction, and electrically and physically connected to the second electrode portion. In this case, the flange part is capable of fixing the position of the element body in the first direction while being electrically connected to the second electrode portion.

In the one aspect above, the second electrode may include: a third electrode portion disposed on the outer side face; and a fourth electrode portion disposed on the second end face to surround the second protruding part, an opening for inserting the second protruding part may be provided in the grounding fitting, and the fourth electrode portion may be electrically and physically connected to a peripheral edge part of the opening of the grounding fitting. In this case, the grounding fitting is capable of fixing the position of the element body in the first direction while being electrically connected to the fourth electrode portion.

In the one aspect above, insides of the through hole, the first case, and the second case need not be filled with a resin sealing material. Insulation can be ensured even in this case.

The high-voltage feedthrough capacitor according to the one aspect above may further include a coating layer covering an exposed portion of the element body. In this case, humidity resistance of the element body can be improved.

DETAILED DESCRIPTION

Embodiments of the present disclosure will be described in detail below with reference to the accompanying drawings. It should be noted that the same reference signs are given to the same elements or elements having the same function in the description, and redundant description will be omitted.

Figure 1:
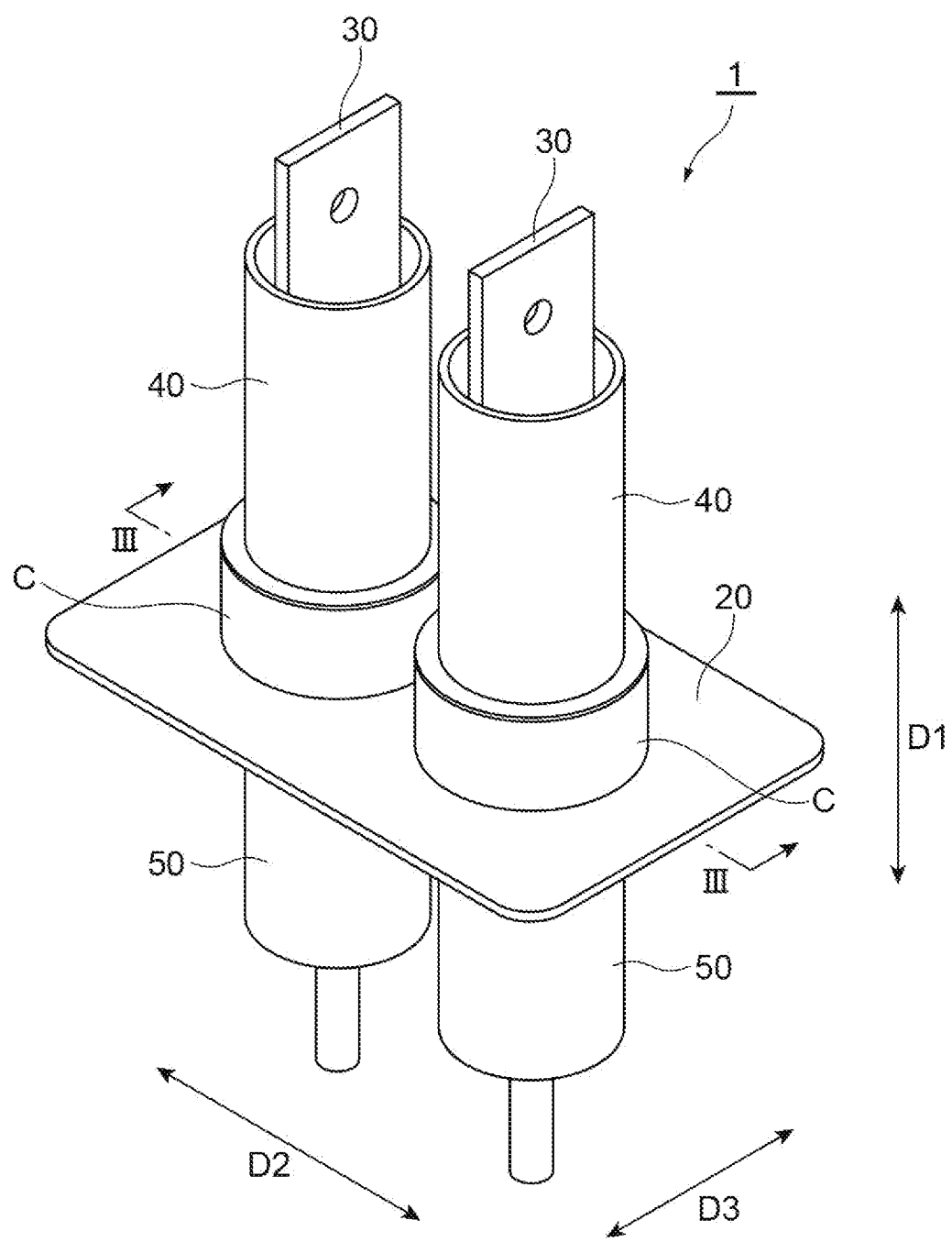
FIG. 1 is a perspective view illustrating a high-voltage feedthrough capacitor according to an embodiment.
Figure 2:
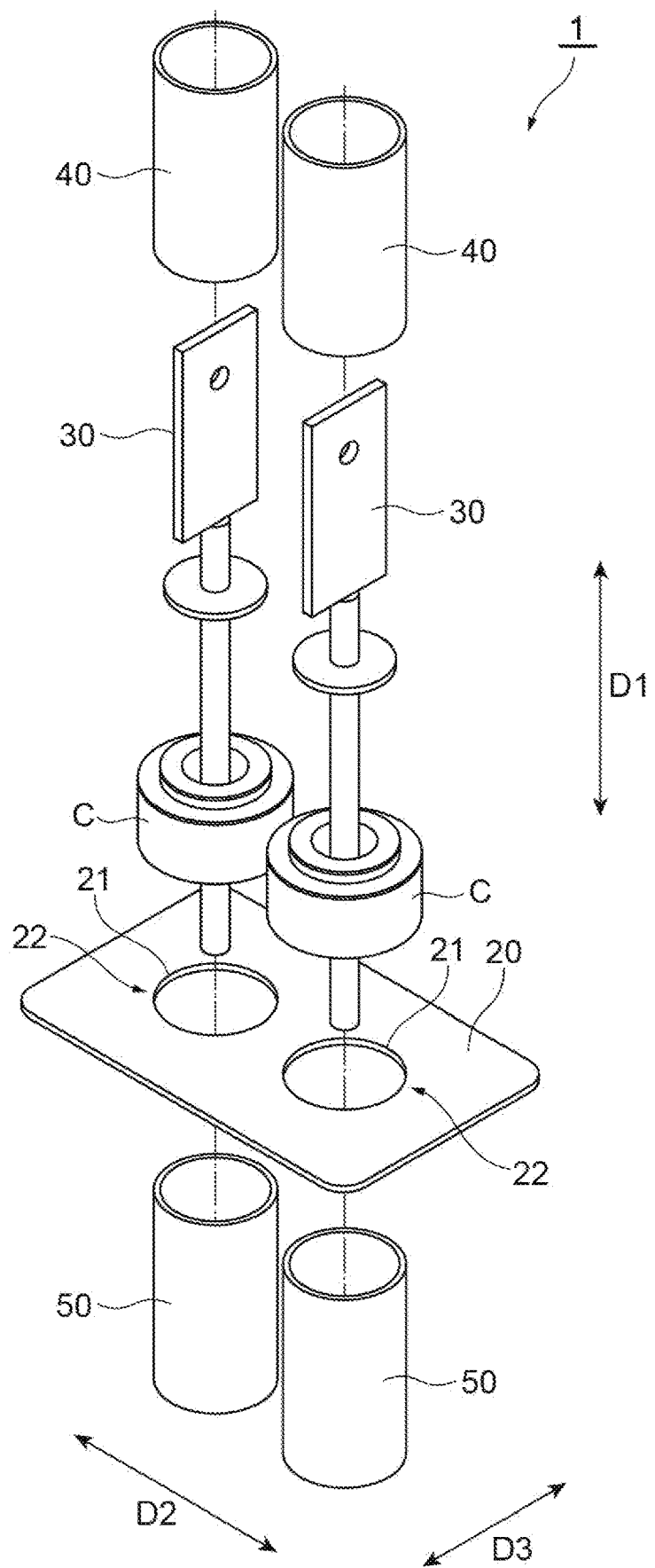
FIG. 2 is an exploded perspective view illustrating the high-voltage feedthrough capacitor according to the present embodiment.
Figure 3:
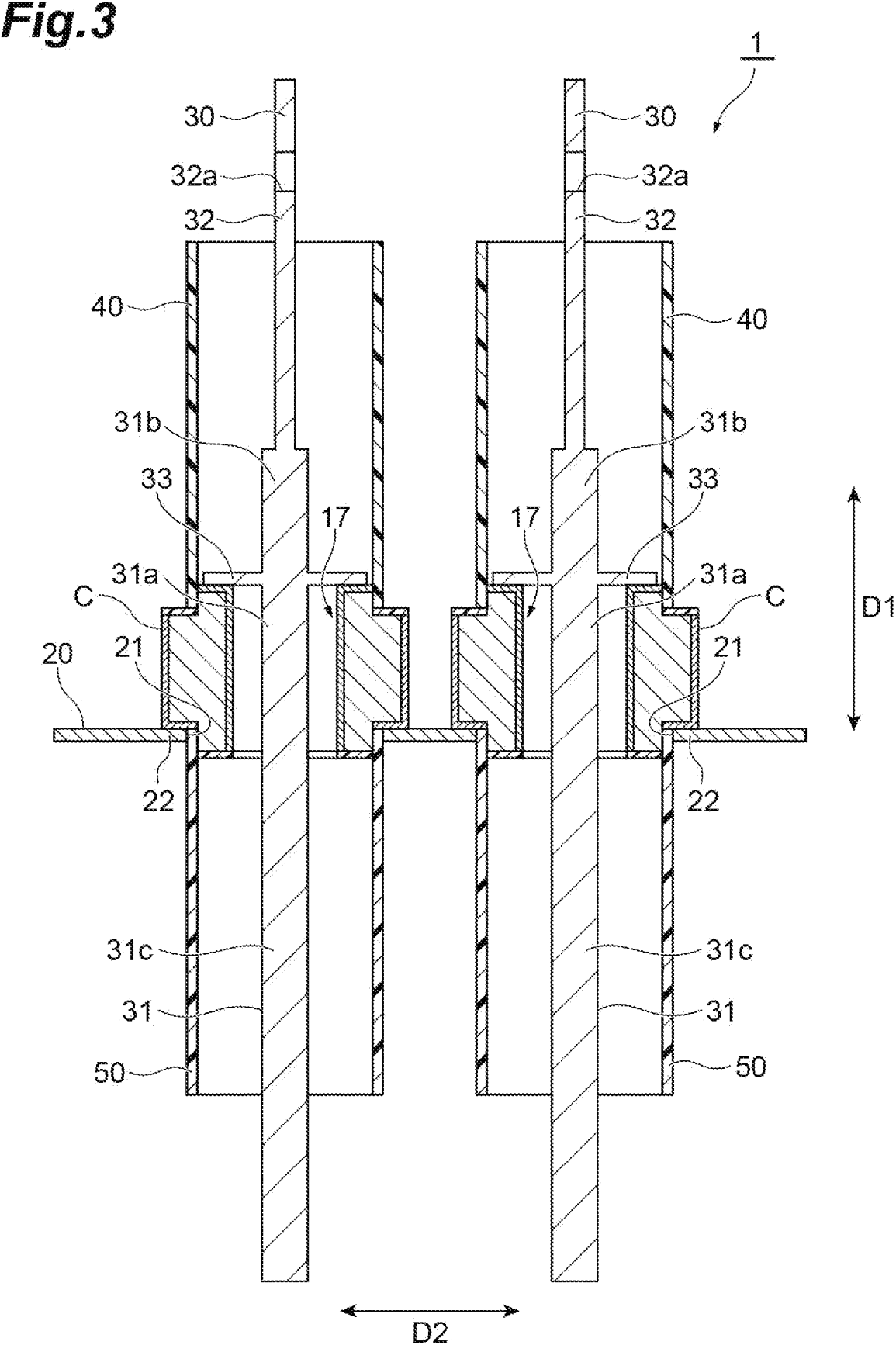
FIG. 3 is a cross-sectional view taken along line III-III in FIG. 1.
Figure 4:
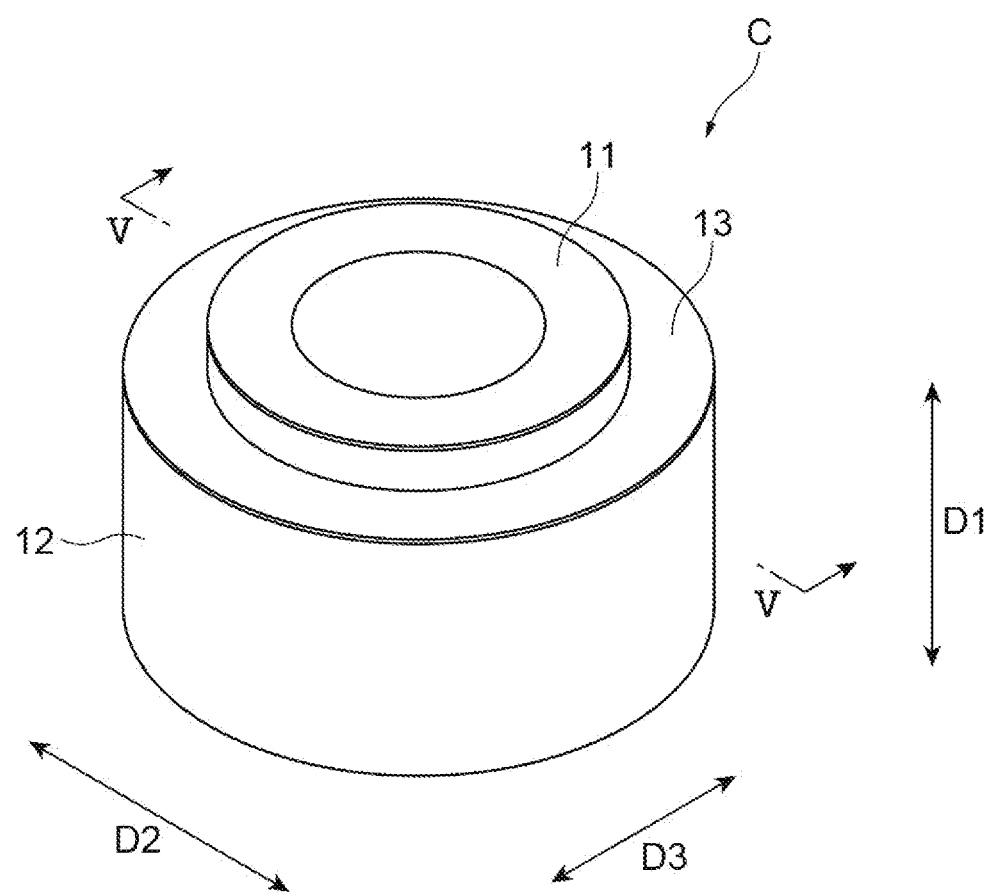
FIG. 4 is a perspective view illustrating a capacitor.
Figure 5:
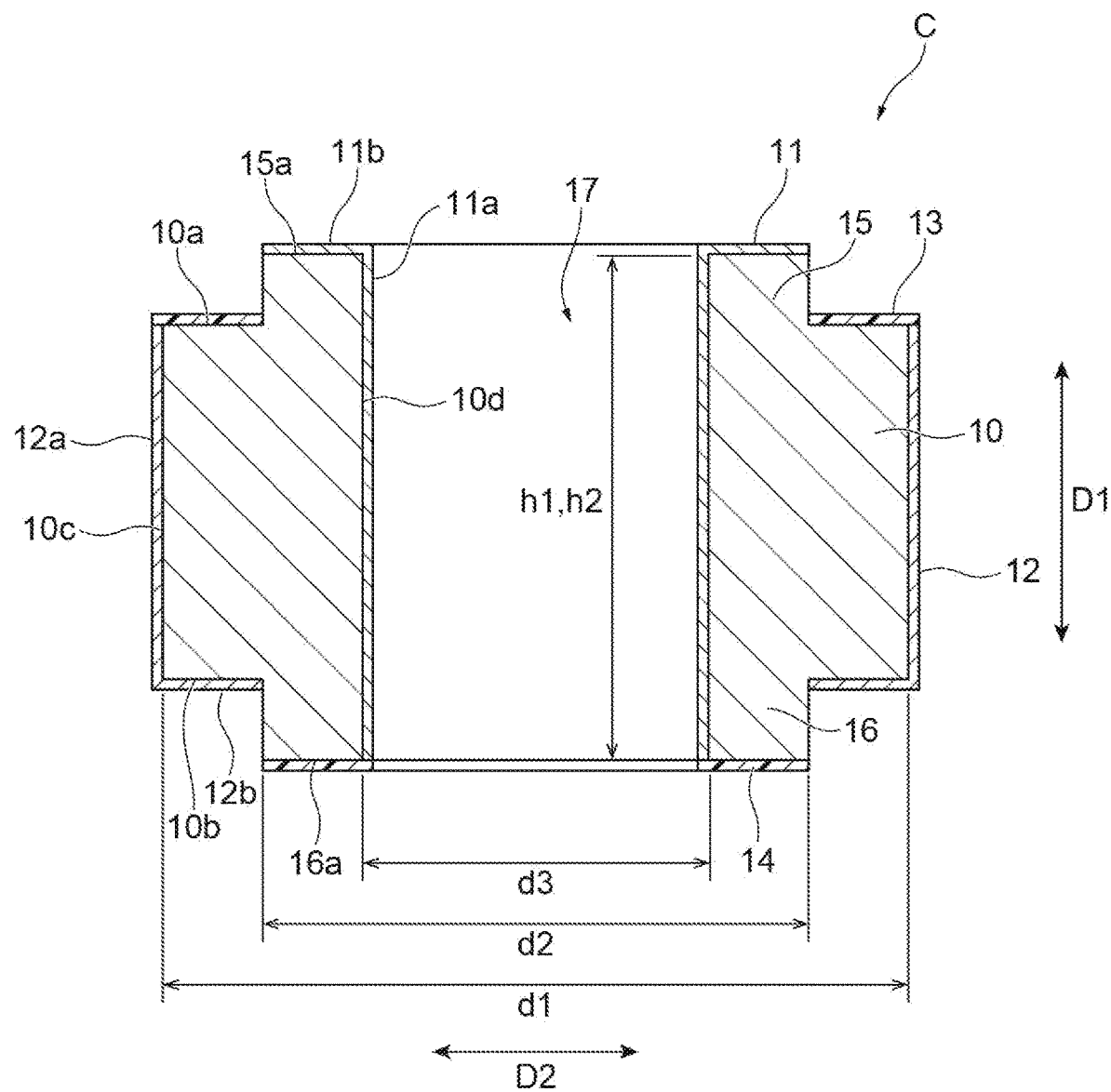
FIG. 5 is a cross-sectional view taken along line V-V in FIG. 4.

The configuration of a high-voltage feedthrough capacitor 1 according to the present embodiment will be described with reference to FIGS. 1 to 5. FIG. 1 is a perspective view illustrating a high-voltage feedthrough capacitor according to the present embodiment. FIG. 2 is an exploded perspective view illustrating the high-voltage feedthrough capacitor according to the present embodiment. FIG. 3 is a cross-sectional view taken along line III-III in FIG. 1. FIG. 4 is a perspective view illustrating a capacitor. FIG. 5 is a cross-sectional view taken along line V-V in FIG. 4.

As illustrated in FIGS. 1 to 3, the high-voltage feedthrough capacitor 1 includes a plurality of capacitors C, a grounding fitting 20, a plurality of feedthrough conductors 30, a plurality of first cases 40, and a plurality of second cases 50. In the present embodiment, the high-voltage feedthrough capacitor 1 includes two capacitors C, two feedthrough conductors 30, two first cases 40, and two second cases 50. The pair of the capacitors C have the same configuration.

As illustrated in FIGS. 4 and 5, each capacitor C has an element body 10, a first electrode 11, a second electrode 12, a first coating layer 13, and a second coating layer 14. The element body 10 has a columnar shape with a first direction D1 being an axial direction. In the present embodiment, the element body 10 has a round columnar shape. The element body 10 has a first end face 10a and a second end face 10b that face each other in the first direction D1. The first end face 10a and the second end face 10b define both end faces of the element body 10 in the first direction D1. Here, the direction from the second end face 10b toward the first end face 10a is upward, and the first end face 10a is positioned above the second end face 10b.

The element body 10 has a first protruding part 15 and a second protruding part 16. The first protruding part 15 is provided on the first end face 10a. The first protruding part 15 is provided in a center portion of the first end face 10a, and protrudes in the first direction D1. The first protruding part 15 has a top face 15a. The second protruding part 16 is provided on the second end face 10b. The second protruding part 16 is provided in a center portion of the second end face 10b, and protrudes in the first direction D1. The second protruding part 16 has a top face 16a. In the present embodiment, the top face 15a and the top face 16a have a circular shape. The top face 15a and the top face 16a have the same shape. A protrusion height of the first protruding part 15 from the first end face 10a is the same as a protrusion height of the second protruding part 16 from the second end face 10b, and is, for example, 1 mm.

A through hole 17 extending in the first direction D1 is formed in the element body 10. The through hole 17 passes through the element body 10 in the first direction D1. The through hole 17 opens in the first protruding part 15 and the second protruding part 16. The through hole 17 opens in a center portion of the top face 15a and a center portion of the top face 16a. The through hole 17 passes through the element body 10 from the top face 15a to the top face 16a. In the present embodiment, the through hole 17 has a circular cross-sectional shape.

The element body 10 has an outer side face 10c and an inner side face 10d. The outer side face 10c extends in the first direction D1, and joins the first end face 10a and the second end face 10b. The outer side face 10c defines an outer periphery of the element body 10 when viewed in the first direction D1. The inner side face 10d faces the outer side face 10c in a direction perpendicular to the first direction D1. The inner side face 10d defines the through hole 17. The inner side face 10d extends in the first direction D1, and joins the top face 15a and the top face 16a. A length of the outer side face 10c in the first direction D1 is less than a length h1 of the inner side face 10d by lengths of the first protruding part 15 and the second protruding part 16.

The element body 10 is made, for example, of an insulating material. The element body 10 includes, for example, ceramic. The ceramic includes, for example, $BaTiO_3$, $BaZrO_3$, $CaTiO_3$, or $MgTiO_3$. The element body 10 may also include an additive added to the ceramic. The additive includes, for example, Si, Mg, Zr, Zn, Y, V, Al, or Mn.

The first electrode 11 and the second electrode 12 are disposed facing each other on the element body 10. The first electrode 11 includes an electrode portion 11a and an electrode portion 11b. The electrode portion 11a is disposed on the inner side face 10d. The electrode portion 11a covers an entirety of the inner side face 10d. A length of the electrode portion 11a in the first direction D1 is the same as the length of the inner side face 10d in the first direction D1. The electrode portion 11b is disposed on the top face 15a. The electrode portion 11b covers an entirety of the top face 15a. The electrode portion 11a and the electrode portion 11b are joined to each other.

The second electrode 12 includes an electrode portion 12a and an electrode portion 12b. The electrode portion 12a is disposed on the outer side face 10c. The electrode portion 12a covers an entirety of outer side face 10c. The electrode portion 12b is disposed on the second end face 10b so as to surround the second protruding part 16. The electrode portion 12b covers an entirety of the second end face 10b. The electrode portion 12a and the electrode portion 12b are joined to each other.

The first electrode 11 and the second electrode 12 include a conductive metal material. The metal conductive material includes, for example, Ag. The first electrode 11 and the second electrode 12 may include a magnetic material together with the conductive metal material. The magnetic material is, for example, Fe, Co, Ni, Cu, or Sr, or a combination thereof. The first electrode 11 and the second electrode 12 are formed, for example, by baking a conductive paste applied to the element body 10. The conductive paste for forming the first electrode 11 and the second electrode 12 includes the conductive metal material above.

The first coating layer 13 is disposed on the first end face 10a so as to surround the first protruding part 15. The first coating layer 13 covers an entirety of the first end face 10a. The first coating layer 13 faces the electrode portion 12b in the first direction D1 via the element body 10. The second coating layer 14 is disposed on the top face 16a. The second coating layer 14 covers an entirety of the top face 16a. The second coating layer 14 faces the electrode portion 11b in the first direction D1 via the element body 10.

The first coating layer 13 and the second coating layer 14 include, for example, a silicone resin or an epoxy resin. The first coating layer 13 and the second coating layer 14 have insulating properties. The first coating layer 13 and the second coating layer 14 impart humidity resistance to the element body 10 by covering exposed portions of the element body 10, that is, the first end face 10a and the top face 16a.

A height of the element body 10 (length of the element body 10 in the first direction D1) is 3 mm or more, and is, for example, 7 mm. The height of the element body 10 is the same as the length h1 of the inner side face 10d in the first direction D1 and a length h2 of the electrode portion 11a in the first direction D1. A diameter d1 of the element body 10 is equal to or greater than 1.5 times a diameter d2 of the first protruding part 15. The diameter d1 is equal to or greater than two times a diameter d3 of the through hole 17. For example, the diameter d1 is 10.5 mm, the diameter d2 is 7.5 mm, and the diameter d3 is 4.5 mm.

As illustrated in FIGS. 1 to 3, the grounding fitting 20 is a flat plate member having a rectangular shape when viewed in the first direction D1. The rectangular shape includes a shape in which corners are rounded or removed. A plurality of openings 21 for inserting the second cases 50 therethrough is provided in the grounding fitting 20. In the present embodiment, two openings 21 are provided arranged along a second direction D2 in the grounding fitting 20. The opening 21 has a circular shape, and has a diameter that is the same as a diameter (outer diameter) of the second case 50.

The grounding fitting 20 is electrically and physically connected to the second electrode 12. The grounding fitting 20 is grounded. The grounding fitting 20 has a peripheral edge part 22 of the opening 21. The peripheral edge part 22 faces the electrode portion 12a in the first direction D1, and is electrically and physically connected to the electrode portion 12a. The peripheral edge part 22 is, for example, bonded to the electrode portion 12b by solder or a conductive paste. The grounding fitting 20 supports the element body 10 by the peripheral edge part 22. The grounding fitting 20 is capable of fixing the position of the element body 10 in the first direction D1.

A length of the grounding fitting 20 in the second direction D2 is 20 mm or more and 50 mm or less, and is, for example, 32 mm. A length of the grounding fitting 20 in a third direction D3 is 10 mm or more and 30 mm or less, and is, for example, 20 mm. A diameter of the opening 21 is less than half the length of the grounding fitting 20 in the second direction D2. The grounding fitting 20 includes a conductive metal material. The conductive metal material includes, for example, Fe, Cu, or a Cu—Zn alloy.

Each of the pair of the feedthrough conductors 30 is inserted through the through hole 17 of the corresponding capacitor C. The feedthrough conductor 30 is electrically and physically connected to the first electrode 11. The feedthrough conductor 30 includes a body part 31, a tab part 32, and a flange part 33. The body part 31 is a rod-like member that extends in the first direction D1. In the present embodiment, the body part 31 has a circular cross-sectional shape. The cross-section of the body part 31 may have a shape other than a circular shape.

The body part 31 has a portion 31a that is inserted through the through hole 17, a portion 31b that protrudes from the top face 15a, and a portion 31c that protrudes from the top face 16a. The portions 31a, 31b, and 31c are integrally formed in a single piece. The portion 31a and the capacitor C face each other via a space. The space between the portion 31a and the capacitor C is not filled with a resin sealing material. An inner space of the through hole 17 is not filled with a resin sealing material.

The tab part 32 is connected to the portion 31b. The tab part 32 functions as a tab terminal. In the present embodiment, the tab part 32 has a rectangular flat plate shape with the second direction D2 being a thickness direction. The tab parts 32 of the pair of the capacitors C are disposed such that main faces thereof face each other in the second direction D2. A through hole 32a that passes through the tab part 32 in the thickness direction (second direction D2) is formed in the tab part 32.

The flange part 33 is provided in a flange shape on an outer peripheral face of the body part 31. The flange part 33 is disposed in a boundary between the portion 31a and the portion 31b. In the present embodiment, the flange part 33 has a disc shape. A diameter of the flange part 33 is greater than a diameter of the through hole 17, and is the same as a diameter of the top face 15a. The flange part 33 faces the electrode portion 11b in the first direction D1, and is electrically and physically connected to the electrode portion 11b. The flange part 33 is, for example, bonded to the electrode portion 11b by solder or a conductive paste. The flange part 33 covers an entirety of the electrode portion 11b.

A length of the feedthrough conductor 30 in the first direction D1 is 30 mm or more and 60 mm or less, and is, for example, 51.1 mm. A diameter of the body part 31 is, for example, 2 mm. An interval (electrode width) in the second direction D2 between the tab parts 32 is 5 mm or more and 35 mm or less, and is, for example, 6.1 mm.

The feedthrough conductor 30 includes a conductive metal material. The conductive metal material includes, for example, Fe, Cu, or a Cu—Zn alloy.

The first case 40 and the second case 50 each has a hollow tubular shape, and surrounds the feedthrough conductor 30. In the present embodiment, the first case 40 and the second case 50 each has a hollow round tubular shape with both ends open. The first case 40 and the second case 50 may have a shape other than a round tubular shape.

The first case 40 is attached to the first protruding part 15. The first case 40 has an inner diameter formed similar to a diameter of the first protruding part 15, and is fitted onto the first protruding part 15. The first case 40 is attached to the first protruding part 15 such that a lower end portion of an inner side face of the first case 40 is in contact with an outer side face of the first protruding part 15. A lower end face of the first case 40 is in contact with the first end face 10a. The first case 40 is adhered to the first protruding part 15, for example, by an adhesive resin.

The first case 40 surrounds an upper end part of the portion 31a, the portion 31b, a portion of the tab part 32, and the flange part 33 of the feedthrough conductor 30. The tab part 32 has a portion protruding from the first case 40. The through hole 32a is provided in the portion of the tab part 32 protruding from the first case 40. The first case 40 and the portion 31b face each other via a space. The space between the first case 40 and the portion 31b is not filled with a resin sealing material. The first case 40 and the tab part 32 face each other via a space. The space between the first case 40 and the tab part 32 is not filled with a resin sealing material. An inner space of the first case 40 is not filled with a resin sealing material.

The second case 50 is attached to the second protruding part 16. The second case 50 has an inner diameter formed similar to a diameter of the second protruding part 16, and is fitted onto the second protruding part 16. The second case 50 is attached to the second protruding part 16 such that an upper end portion of an inner side face of the second case 50 is in contact with an outer side face of the second protruding part 16. An upper end face of the second case 50 is in contact with the second end face 10b. The second case 50 is adhered to the second protruding part 16, for example, by an adhesive resin.

The second case 50 surrounds a lower end part of the portion 31a and a part of the portion 31c of the feedthrough conductor 30. The portion 31c has a part protruding from the second case 50. The second protruding part 16 is inserted into the opening 21 of the grounding fitting 20 together with the upper end portion of the second case 50. The second case 50 and the portion 31c face each other via a space. The space between the second case 50 and the portion 31c is not filled with a resin sealing material. An inner space of the second case 50 is not filled with a resin sealing material.

A length of the first case 40 in the first direction D1 is equal to or less than half the length of the feedthrough conductor 30 in the first direction D1, and is, for example, 20.6 mm. A length of the second case 50 in the first direction D1 is equal to or less than half the length of the feedthrough conductor 30 in the first direction D1, and is, for example, 15 mm. The inner diameters of the first case 40 and the second case 50 are the same as the diameters of the first protruding part 15 and the second protruding part 16, and are, for example, 7.5 mm.

The first case 40 and the second case 50 include an insulating material and have insulating properties. The insulating material includes, for example, polybutylene terephthalate (PBT), polyethylene terephthalate (PET), or modified melamine. The insulating material may include an inorganic substance. The inorganic substance includes, for example, glass powder and ceramic powder. The glass powder includes, for example, industrial glass powder. The ceramic powder includes, for example, $SiO_2$ powder, $Al_2O_3$ powder, talc ($Mg_3Si_4O_{10}(OH)_2$), aluminum nitride (AlN), or silicon nitride ($Si_3N_4$), or a mixture thereof.

As described above, in the high-voltage feedthrough capacitor 1, the first case 40 and the second case 50 surround the feedthrough conductor 30, so that gaseous discharge between the feedthrough conductor 30 and the grounding fitting 20 can be suppressed. Thus, insulation can be ensured without sealing the feedthrough conductor 30 using a resin sealing material. The first case 40 is fitted onto the first protruding part 15 that is provided on the first end face 10a of the element body 10, so that the first case 40 can be reliably fixed. The second case 50 is fitted onto the second protruding part 16 that is provided on the second end face 10b of the element body 10, so that the second case 50 can be reliably fixed.

In the high-voltage feedthrough capacitor 1, a resin sealing material is not used, so that there are no problems such as leakage of resin from gaps in the product in the production line. Characteristic defects and reliability failures caused by the quality of the resin itself (such as thickening) are suppressed. The quality of the resin itself causing failures in casting equipment and stopping the production line is also suppressed. Since the high-voltage feedthrough capacitor 1 includes the capacitors C separate from each other, the need for a resin sealing material to insulate the capacitors is eliminated unlike in a configuration in which the capacitors are integrated. By eliminating the resin sealing material, there will be no problems caused by the difference in the coefficient of linear expansion between resin and ceramic.

The element body 10 has the outer side face 10c and the inner side face 10d that face each other in the direction perpendicular to the first direction. The first electrode 11 is disposed on the inner side face 10d, and the second electrode 12 is disposed on the outer side face 10c. Thus, an electric field can be generated by causing the first electrode 11 and the second electrode 12 to face each other in the direction perpendicular to the first direction D1. The second electrode 12 disposed on the outer side face 10c is connected to the grounding fitting 20 that is grounded. This eliminates the electric potential difference between the second electrodes 12 of the adjacent capacitors C, so that the distance between the capacitors C can be shortened.

The feedthrough conductor 30 includes the flange part 33 which faces, in the first direction D1, the electrode portion 11b disposed on the top face 15a, and which is electrically and physically connected to the electrode portion 11b. The flange part 33 is thus capable of fixing the position of the element body 10 in the first direction D1 while being electrically connected to the electrode portion 11b.

The grounding fitting 20 includes the peripheral edge part 22 which faces, in the first direction D1, the electrode portion 12b disposed on the second end face 10b, and which is electrically and physically connected to the electrode portion 12b. The grounding fitting 20 is thus capable of fixing the position of the element body 10 in the first direction D1 while being electrically connected to the electrode portion 12b.

The first coating layer 13 and the second coating layer 14 are respectively provided on the first end face 10a and the top face 16a, which are exposed portions of the element body 10. The humidity resistance of the element body 10 can thus be improved.

Although the embodiments of the present invention have been described above, the present invention is not necessarily limited to the embodiments above, and various modifications are possible without departing from the gist thereof.

Figure 6:
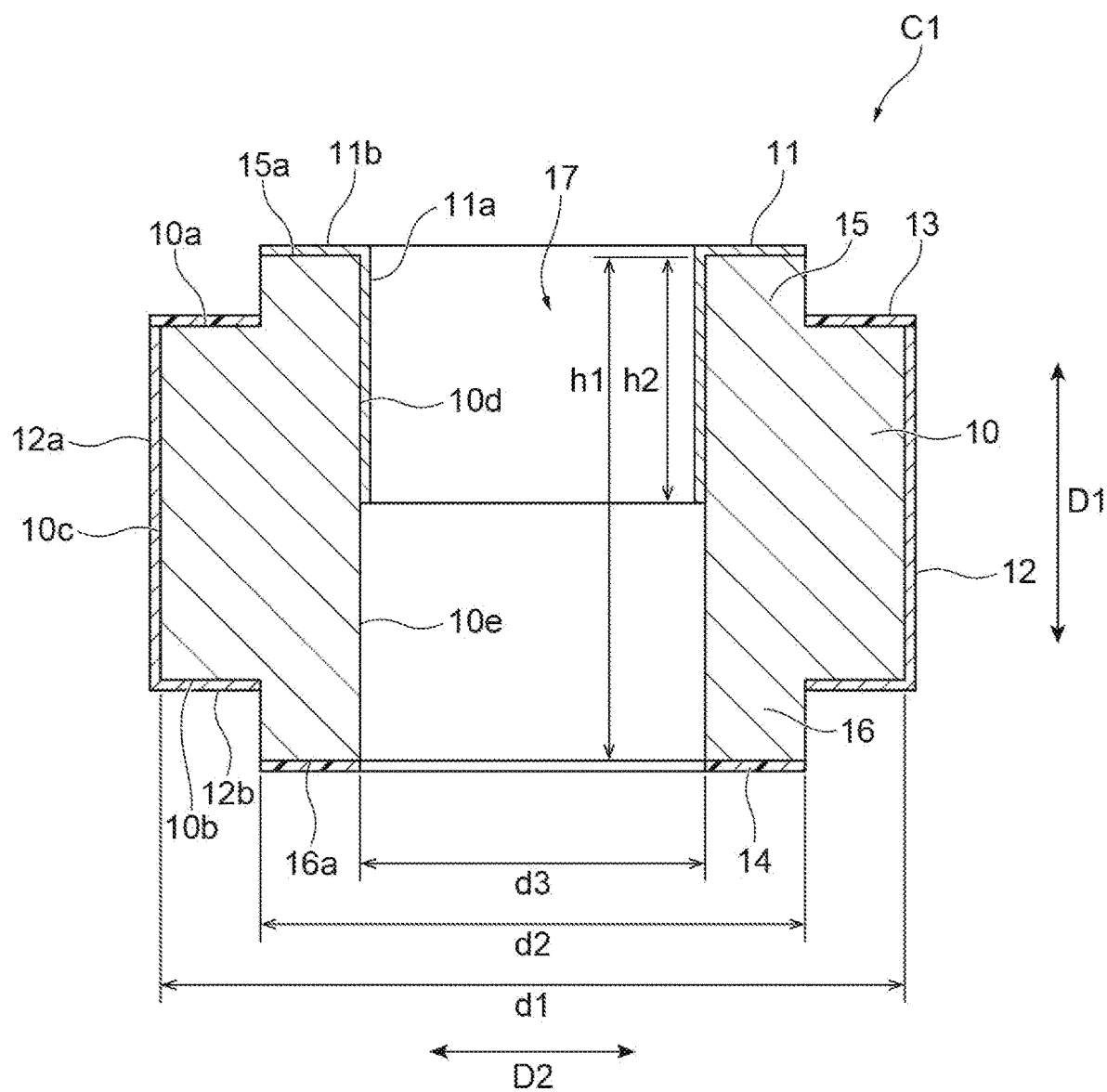
FIG. 6 is a cross-sectional view of a capacitor according to a variation.

FIG. 6 is a diagram illustrating the cross-sectional configuration of a capacitor according to a variation. As illustrated in FIG. 6, a capacitor C1 according to the variation is different from the capacitor C (see FIG. 5) in that the electrode portion 11a does not cover the entirety of the inner side face 10d. The inner side face 10d has an exposed region 10e that is exposed from the electrode portion 11a. The exposed region 10e is disposed in a position adjoining the top face 16a. The exposed region 10e may be provided with a coating layer (not shown) to improve humidity resistance. In this variation, the length h2 of the electrode portion 11a is half the length h1 of the inner side face 10d, and is, for example, 3.5 mm.

In the capacitor C1, the inner side face 10d has the exposed region 10e that is exposed from the first electrode 11 in a position adjoining the top face 16a. Thus, electrical shorting can be suppressed by adequately separating the electrode portion 11a disposed on the inner side face 10d and the electrode portion 12b disposed on the second end face 10b.

Although the high-voltage feedthrough capacitor 1 includes two capacitors C and two feedthrough conductors 30, it may include three or more capacitors C and three or more feedthrough conductors 30, or may include one capacitor C and one feedthrough conductor 30.

The embodiments and variation above may be combined as appropriate.

What is claimed is:

1. A high-voltage feedthrough capacitor comprising:
   a capacitor including an element body in which a through hole extending in a first direction is formed, and a first electrode and a second electrode disposed facing each other on the element body;
   a feedthrough conductor inserted through the through hole and electrically connected to the first electrode;
   a grounding fitting electrically connected to the second electrode; and
   a first case and a second case having a tubular shape and surrounding the feedthrough conductor,
   wherein the element body includes:
     a first end face and a second end face facing each other in the first direction;
     a first protruding part in which the through hole opens, the first protruding part being provided on the first end face; and
     a second protruding part in which the through hole opens, the second protruding part being provided on the second end face,
   wherein the first case is attached to the first protruding part, and wherein the second case is attached to the second protruding part.

2. The high-voltage feedthrough capacitor according to claim 1,
wherein the element body further includes:
an outer side face extending in the first direction, and joining the first end face and the second end face; and
an inner side face facing the outer side face in a direction perpendicular to the first direction, and defining the through hole,
wherein the first electrode is disposed on the inner side face, and
wherein the second electrode is disposed on the outer side face.

3. The high-voltage feedthrough capacitor according to claim 2,
wherein the inner side face has an exposed region exposed from the first electrode in a position adjoining a top face of the second protruding part.

4. The high-voltage feedthrough capacitor according to claim 2,
wherein the first electrode includes:
a first electrode portion disposed on the inner side face; and
a second electrode portion disposed on a top face of the first protruding part, and
wherein the feedthrough conductor includes a flange part facing the second electrode portion in the first direction, and electrically and physically connected to the second electrode portion.

5. The high-voltage feedthrough capacitor according to claim 2,
wherein the second electrode includes:
a third electrode portion disposed on the outer side face; and
a fourth electrode portion disposed on the second end face to surround the second protruding part,
wherein an opening for inserting the second protruding part is provided in the grounding fitting, and
wherein the fourth electrode portion is electrically and physically connected to a peripheral edge part of the opening of the grounding fitting.

6. The high-voltage feedthrough capacitor according to claim 1,
wherein insides of the through hole, the first case, and the second case are not filled with a resin sealing material.

7. The high-voltage feedthrough capacitor according to claim 1, further comprising a coating layer covering an exposed portion of the element body.

8. The high-voltage feedthrough capacitor according to claim 7,
wherein the coating layer includes a first coating layer disposed on the first end face so as to surround the first protruding part.

9. The high-voltage feedthrough capacitor according to claim 7,
wherein the coating layer includes a second coating layer disposed on a top face of the second protruding part.

10. The high-voltage feedthrough capacitor according to claim 1,
wherein the element body and the feedthrough conductor face each other via a space.

11. The high-voltage feedthrough capacitor according to claim 1,
wherein the first case and the feedthrough conductor face each other via a space.

12. The high-voltage feedthrough capacitor according to claim 1,
wherein the second case and the feedthrough conductor face each other via a space.

13. The high-voltage feedthrough capacitor according to claim 1,
wherein the first case is fitted onto the first protruding part.

14. The high-voltage feedthrough capacitor according to claim 1,
wherein the second case is fitted onto the second protruding part.

15. The high-voltage feedthrough capacitor according to claim 1,
wherein the capacitor includes capacitors separate from each other.

16. The high-voltage feedthrough capacitor according to claim 15,
wherein the grounding fitting is electrically connected to the second electrode of each of the capacitors.

17. The high-voltage feedthrough capacitor according to claim 1,
wherein the first case and the second case have insulating properties.

* * * * *